(12) United States Patent
Fransen

(10) Patent No.: US 9,742,740 B2
(45) Date of Patent: Aug. 22, 2017

(54) INTERNET OF THINGS DATAPOINT ENGINE

(71) Applicant: ADOBE SYSTEMS INCORPORATED, San Jose, CA (US)

(72) Inventor: Peter Raymond Fransen, Soquel, CA (US)

(73) Assignee: ADOBE SYSTEMS INCORPORATED, San Jose, CA (US)

(*) Notice: Subject to any disclaimer, the term of this patent is extended or adjusted under 35 U.S.C. 154(b) by 101 days.

(21) Appl. No.: 14/944,801

(22) Filed: Nov. 18, 2015

(65) Prior Publication Data

US 2017/0142073 A1 May 18, 2017

(51) Int. Cl.
*H04L 29/06* (2006.01)
*H04L 29/08* (2006.01)

(52) U.S. Cl.
CPC ........ *H04L 63/0428* (2013.01); *H04L 63/061* (2013.01); *H04L 67/16* (2013.01)

(58) Field of Classification Search
CPC .................................................. H04L 63/0428
See application file for complete search history.

(56) References Cited

U.S. PATENT DOCUMENTS

| | | | | |
|---|---|---|---|---|
| 8,749,378 B2* | 6/2014 | Srinivasan | ............ | G01S 5/0009 340/10.1 |
| 9,124,563 B2* | 9/2015 | Castillo | ................. | H04L 63/061 |
| 9,461,976 B1* | 10/2016 | Smith | .................... | H04L 63/062 |
| 9,538,311 B2* | 1/2017 | Baum | ................. | H04L 63/0807 |
| 9,569,907 B2* | 2/2017 | Benson | ............ | G07B 17/00508 |
| 2006/0106825 A1* | 5/2006 | Cozzi | ................ | G06F 17/30604 |
| 2015/0365826 A1* | 12/2015 | Mancini | ................ | H04W 12/06 713/155 |
| 2016/0195881 A1* | 7/2016 | Britt | ....................... | G08C 17/02 700/276 |
| 2016/0205097 A1* | 7/2016 | Yacoub | ............... | H04L 63/0876 726/6 |
| 2016/0248746 A1* | 8/2016 | James | ................. | H04L 61/1511 |
| 2016/0301695 A1* | 10/2016 | Trivelpiece | ......... | H04L 63/0876 |
| 2016/0364553 A1* | 12/2016 | Smith | .................... | G06F 21/105 |
| 2017/0111333 A1* | 4/2017 | Smith | ....................... | H04L 9/14 |

* cited by examiner

*Primary Examiner* — Ali Shayanfar
(74) *Attorney, Agent, or Firm* — Shook Hardy & Bacon L.L.P.

(57) ABSTRACT

Techniques allow owners of Internet of Things (IoT) devices to provide specific access to data from their IoT devices to requesters of data. A request for data from one or more IoT devices is received from one or more requesters, and the request is provided to the owner of the one or more IoT devices. An indication of acceptance by the owner is provided for at least one of the requests from the requesters. A public key of a public/private key pair associated with each of the accepted requester(s) is received. A plurality of datapoints from the one or more IoT devices is also received. For each of the selected requester(s), at least one datapoint of the plurality of datapoints is encrypted with the public key of the requester. The encrypted at least one datapoint is then sent to the requester, where the requester can decrypt the encrypted at least one datapoint using the private key of the public/private key pair.

17 Claims, 5 Drawing Sheets

US 9,742,740 B2

INTERNET OF THINGS DATAPOINT ENGINE

BACKGROUND

Internet of Things (IoT) is often used to refer to a network of physical objects, or "Things," embedded with sensors and electronics that provide network connectivity, enabling the objects to collect and exchange data. These objects can take a variety of forms with widely varying hardware configurations and capabilities. Interest in IoT has increased as device manufacturers seek to find and implement additional functionality for devices. IoT-enabled devices (hereinafter "IoT devices") collect and receive data, such as state information or location information, to provide this additional functionality for the devices. While IoT devices allow for communication within a local network and between devices in a local environment, data associated with these devices may be desired by entities outside the local network and/or environment for numerous purposes.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention are concerned with providing a mechanism for owners of IoT devices to provide specific access to datapoints of their IoT devices to requesters of data from the IoT devices. In some embodiments described herein, a datapoint engine or other device receives, from requesters, requests for access to data from IoT devices. The owner of the IoT devices is provided with the requests, which may include a list of the requesters and the particular data that the requesters are requesting. The owner of the IoT devices chooses which of the requesters to grant access to the data from the IoT devices. A public key of a public/private key pair is received from a selected requester (who was granted access) to encrypt the data from the IoT devices so that only a private key of the requester can decrypt the data. As data from the owner's IoT devices are received, the data specified by the requester from IoT devices is encrypted with the public key and sent to the requester. The requester thereafter can decrypt the data using the private key of the public/private key pair.

BRIEF DESCRIPTION OF THE DRAWINGS

The present invention is described in detail below with reference to the attached drawing figures, wherein.

DETAILED DESCRIPTION

Figure 1:
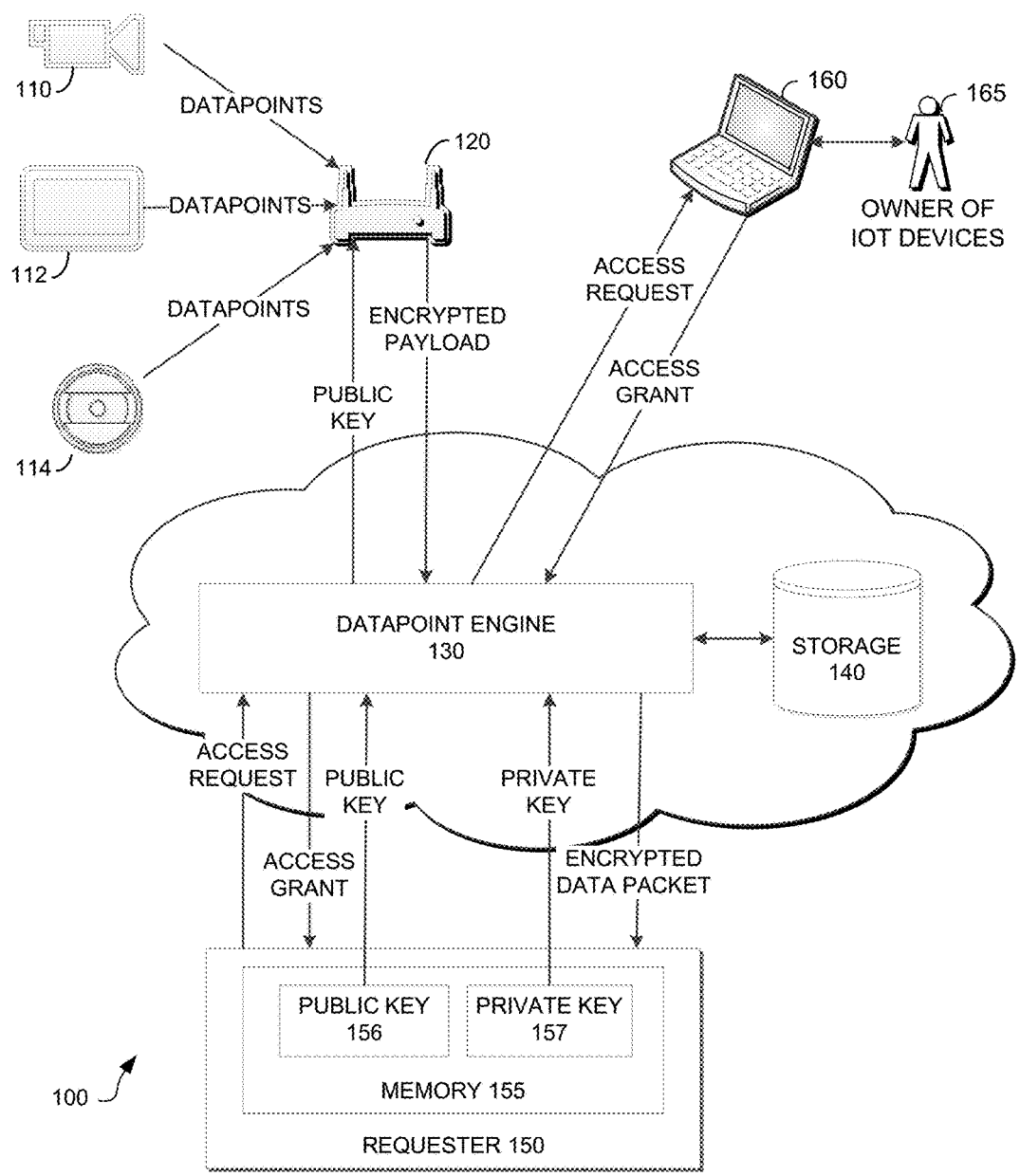
FIG. 1 is a block diagram illustrating an exemplary system for providing specific access to datapoints of IoT devices in accordance with implementations of the present disclosure.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising." In addition, words such as "a" and "an," unless otherwise indicated to the contrary, include the plural as well as the singular. Thus, for example, the requirement of "a feature" is satisfied where one or more features are present. Also, the term "or" includes the conjunctive, the disjunctive and both (a or b thus includes either a or b, as well as a and b) unless otherwise indicated to the contrary.

An "Internet of Things (IoT) device" is defined herein as a device embedded with sensors and electronics that provide network connectivity, enabling sensing and control of the device. Communication with the IoT device can occur via, e.g., an IoT hub or smartphone. This communication channel enables the IoT device to, e.g., send/receive instructions, as well as share data regarding the IoT device. Illustrated examples of IoT devices include communication devices such as a wireless router and wired modem; content consumptive devices such as a television and game console; wearable devices such as glasses and a watch; content capture devices such as a microphone and camera; and appliances such as a washing machine, refrigerator, coffee maker, and thermostat. It should be understood that the prior list is illustrative and not exhaustive, and many other IoT devices can be contemplated.

A "datapoint" is defined herein as a unit of data that is collected by an IoT device. For example, if the IoT device is a thermometer, a datapoint can be a temperature at a given point in time. The IoT device can be constantly collecting and sending datapoints. The interval at which datapoints are collected and sent can be continuous or at predetermined intervals. Hereinafter, the terms "datapoint" and "data" may be used interchangeably.

A "requester" is defined herein as a system requesting data from IoT devices. For example, a requester can be a marketing system requesting viewing habits of television viewers. Thus, the marketing system may send a request to owners of IoT televisions to receive datapoints from the IoT televisions. This data may help the marketing system, e.g., in targeting advertisements or determining demographic information. The marketing system provides a public key associated with the marketing system in order to encrypt the data from the IoT televisions. As another example, a requester can be an analytics system. The analytics system would potentially like to know the contents of owners' refrigerators. Thus, the analytics system may send a request to owners of IoT refrigerators to receive data on the contents of the IoT refrigerators. The analytics system also provides a public key associated with the grocery store or chain for use in encrypting the data on the contents of owners' refrigerators. The requester can be a data aggregating system. The data aggregating system can collect data on various devices and provide the data to third-parties. The requester can be a system of the manufacturer of the IoT device. The manufacturer of the IoT device may request data on the health of the IoT device or usage of the IoT device. The requester may be a system of the manufacturer of an IoT hub and may request data on devices that the IoT hub is connected to. It should be understood that a requester is not limited to the above example, and can be any system requesting data from IoT devices. For example, a requester can be a bidding system, reporting system, advertising system, web experience management system, etc.

An "owner" or "owner of an IoT device" is defined herein as an entity that controls access to the IoT devices. Generally, an owner will be the owner or user of the IoT device. For example, the owner of an IoT thermostat is the owner or renter of the home in which the IoT thermostat is installed. The owner can grant or deny access to the data of the IoT thermostat. The owner need not be the owner of the environment in which the IoT device is installed or used and can be any entity that controls the access to the data of the IoT device.

IoT devices usually communicate with other devices in the same local network. For example, a house may have a wireless router, smart TV, Wi-Fi thermometer, etc. Each of these devices can communicate with an IoT hub and/or other devices in the network. This enables the IoT devices to use context information from the local network to, e.g., assign settings, determine an activity, etc.

In addition to collecting data to communicate with other devices within the local network, this data may be communicated to entities outside the local network. For example, the manufacturer of the IoT device may wish to collect data on the health of the IoT device or collect statistical information on its use. In addition, marketers may also wish to collect data from the IoT device for marketing purposes, since this data is highly valuable for marketing purposes. However, the owner of the IoT device usually does not receive any direct benefit from this data being provided to marketer.

Embodiments of the present invention are directed to providing specific access to datapoints of IoT devices, in a manner that allows the owner of the IoT devices to determine which requesters are given access to their IoT device data. Among other things, this may provide incentive for requesters to offer some benefit to the owner of the IoT device for access to this data. In some embodiments described herein, a requestor submits an access request to access certain datapoints from an IoT device. The access request is provided to the owner of the IoT device, who may determine whether to grant access. If the owner of the IoT device grants access, a public key of a public/private key pair is received from the requester. Datapoints received from the IoT device are encrypted with the public key and sent to the requester. The requester can access the data using the private key of the public/private key pair. Thus, embodiments of the present invention provide a way for an owner of an IoT device to share data from their IoT devices while ensuring the owner of the IoT devices has control over which requestors has access to data from the IoT devices and when the requestors have access to the data.

FIG. 1 is a block diagram illustrating an exemplary system for providing specific datapoints for IoT devices. A system for providing specific datapoints for IoT devices 100 includes IoT devices 110, 112, 114, an IoT hub 120, datapoint engine 130, and storage 140.

The IoT devices 110, 112, 114 collect and send/receive data regarding the device. In some embodiments, the IoT devices 110, 112, 114 also collect and send/receive data regarding its environment and/or other IoT devices. For example, an IoT device can be a digital camera. The digital camera can send pictures wirelessly to other devices. The camera may also receive information on its location, e.g., via a GPS component. Some IoT devices may be able to communicate outside a local network via Wi-Fi and be directly connected to the network. Other devices may only be able to communicate using a low-power communication protocol, e.g., Bluetooth low energy or ZigBee, and require the IoT hub 120 to communicate outside the local network.

The IoT hub 120 allows for communication between devices by sending to and/or receiving data from the IoT devices 110, 112, 114. The IoT hub 120 can be a stand-alone device, can be embedded in a control device such as a smartphone or PC, or may be another IoT device. The IoT hub 120 is located in the local environment of the IoT device 110, 112, 114, enabling communication via a low-power communication protocol or other communication protocol. The IoT hub 120 can receive one or more public keys 152 from a requester 150 outside the local network. In some embodiments, the IoT hub 120 receives the one or more public keys 152 via the datapoint engine 130. The public key 152 is provided by the requester 150, whereby the requester 150 is allowed access to some data using a corresponding private key 154. For example, if a requester 150 wishes to collect data from the IoT devices 110, 112, 114, the requester 150 can send a request for access to the data. After the owner of the IoT devices 165 permits the requester 150 access to the data, the requester 150 provides a public key 156 for the requested data to be encrypted. The requester 150 can access the encrypted data using its private key 157.

The IoT hub 120 can store the public keys for the various requesters to which the owner of the IoT devices is providing data. The IoT hub 120 also receives datapoints from the IoT devices 110, 112, 114. This data can be any data collected by the IoT device 110, 112, 114. For example, a Wi-Fi thermometer can provide data on temperature settings, activities of owners, etc. An IoT refrigerator can provide data on internal temperatures, temperature settings, contents of the refrigerator, etc. This data is received by the IoT hub 120 and encrypted using the public keys. The IoT hub 120 can determine which data to encrypt and which public key(s) to use to encrypt the data. For example, if a requester 150 requests data from a Wi-Fi thermometer, only the data for the Wi-Fi thermometer is encrypted with the requester's public key. Thus, the requester 150 does not have access to datapoints from other IoT devices unless granted access by the owner 165, e.g., via the IoT hub 120.

The IoT hub 120 sends the encrypted data (i.e., encrypted payload) to the datapoint engine 130. There, all of the data corresponding to a public key is aggregated and stored in storage 140. Thus, if a requester has multiple requests, each request can have a corresponding public key, and the data is aggregated for that public key. In some embodiments, the IoT hub 130 sends the plurality of datapoints to the datapoint engine 130 to be encrypted. In some embodiments, the encrypted datapoint includes a datapoint name, an encrypted value, a time interval, and an owner id. In some embodiments, the IoT device 110, 112, 114 sends the data directly to the datapoint engine 130, bypassing the IoT hub 120. If the datapoints are received by the datapoint engine 130, the datapoint engine 130 can encrypt the datapoints using the public key 156. When a requester 150 accesses the data, the requester 150 sends a private key 157 to the datapoint engine 130 to receive an encrypted data packet. In some embodiments, the data is decrypted on the datapoint engine 130 and the decrypted data is sent to the requester 150. It should be understood that the datapoint engine 130 is displayed separately from the IoT 120 for illustrative purposes only, and that the datapoint engine 130 may be located on the IoT hub 120 and/or be a part of the IoT hub 120. Furthermore, the storage 140 may also be located on the IoT hub 120 and/or on a separate device from the datapoint engine 130.

The requester 150 can send requests for data to the IoT hub 120 or the datapoint engine 130. In some embodiments, the datapoint engine 130 passes the requests to the IoT hub 120. The request can indicate, e.g., what type of data, how often to collect data points or a time interval, and/or what type of compensation is offered for the data. As described below, requests are provided to the owner of the IoT devices 165 to provide the owner of the IoT devices 165 with the opportunity to grant access. Once the requester 150 receives an indication of acceptance of the request, the requester 150 can send a public key 156 to the IoT hub 120 or the datapoint engine 130. The requester 150 also sends a private key 157 to the datapoint engine 130 to access and/or decrypt encrypted data from IoT devices. The public key 156 and private key 157 can be stored in memory 155 of the requester.

In some embodiments, the private key 157 is used to identify the data belonging to the requester 150. For example, the datapoint engine 130 can perform an operation to determine if the private key matches the encrypted data, i.e., determine if an encrypted identifier matches the requester. If the private key matches the encrypted data, then the data is part of the data being collected for the requester 150. Thus, requesters only have access to data to which they have the corresponding private key. In some embodiments, the storage 140 is visible to other requesters, but the data is only accessible by the requester with the matching private key. Although a requester 150 can see that data is present in the storage 140 for other requesters, the requester 150 would not know the contents of the data of other requesters. In some embodiments, the storage 140 is part of the IoT hub 120, and requesters access data from the IoT hub 120.

The datapoint engine 130 can provide functionality to the owner of the IoT devices 165 to grant access to specific datapoints, for specific periods of time, and to specific requesters. For example, the datapoint engine 130 can provide a user interface accessible via a computing device 160 of the owner of the IoT device 165 to provide access requests to the owner of the IoT devices 165 and allow the owner of the IoT devices to select requests made by requesters and grant access. The computing device 160 can display all of the requests for data from requesters and provide a mechanism for the owner of the IoT device 165 to provide access to the requests. For example, the user interface can display offers from various requester and means to select the offers. Although not shown in FIG. 1, in some embodiments, access requests and access grants may be routed through the IoT hub 120. The datapoint engine 130 can also enable requesters to retrieve the specific datapoints from owners of IoT devices who have granted access to the requester. In some embodiments, the datapoint engine 130 can determine which datapoints are available and only provide those requesters that request data corresponding to the available datapoints. The datapoint engine 130 can be hosted on a cloud environment. In some embodiments, the encrypted datapoint is stored on the datapoint engine 130, via the storage 140, for a time interval specified in the encrypted datapoint. Although a cloud environment is described, it should be understood that the datapoint engine 130 may also be located on a single user device or multiple user devices. It should also be understood that the IoT hub 120 may also be part of the cloud environment 130, e.g., web-based applications, and is shown as being separate from the cloud environment 130 for illustrative purposes only.

Having described various aspects of the system for providing specific access to datapoints of IoT devices 100, it is noted that any number of components may be employed to achieve the desired functionality within the scope of the present disclosure. Although the various components of FIG. 1 are shown with lines for the sake of clarity, in reality, delineating various components is not so clear, and metaphorically, the lines may more accurately be grey or fuzzy. Further, although some components of FIG. 1 are depicted as single components, the depictions are exemplary in nature and in number and are not to be construed as limiting for all implementations of the present disclosure. It should be understood that this and other arrangements described herein are set forth only as examples. Other arrangements and elements (e.g., machines, interfaces, functions, orders, and grouping of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Figure 2A:
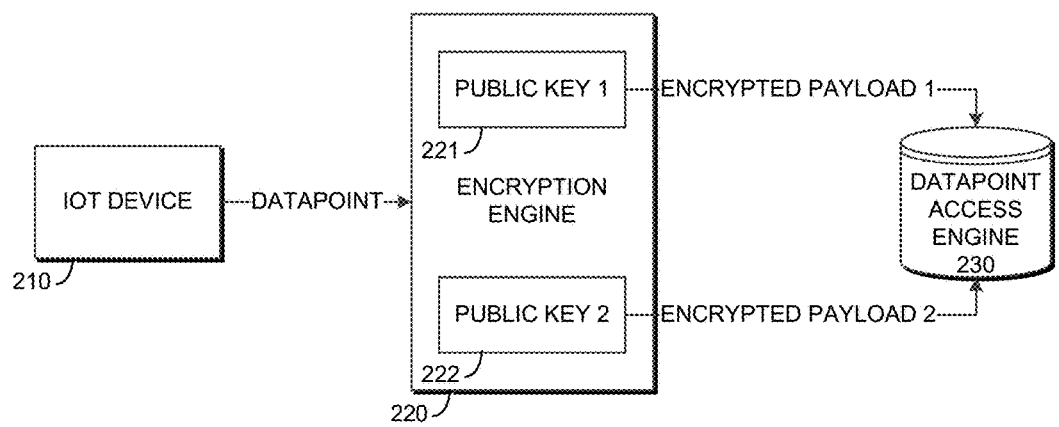
FIG. 2a is a diagram illustrating encrypting datapoints of IoT devices in accordance with implementations of the present disclosure.
Figure 2B:
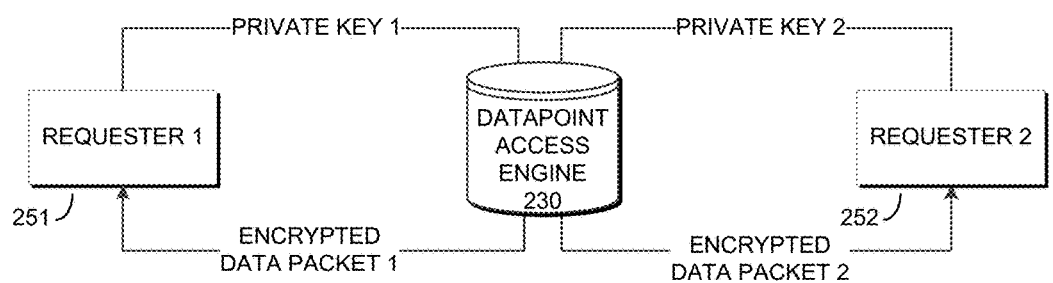
FIG. 2b is a diagram illustrating decrypting datapoints of IoT devices in accordance with implementations of the present disclosure.

FIGS. 2a and 2b are diagrams illustrating providing specific access to datapoints of IoT devices, in accordance with implementations of the present disclosure. Referring to FIG. 2a, an IoT device 210 sends a datapoint to an encryption engine 220. It should be understood that the encryption engine 220 can be on, for instance, an IoT hub (such as the IoT hub 120 in FIG. 1), a datapoint engine (such as the datapoint engine 130 in FIG. 1), or on the IoT device 210 itself. The encryption engine 220 can be also be located on a device separate from the IoT device 210, IoT hub, or datapoint engine 130. Although FIG. 2a illustrates a single datapoint being sent, it should be understood that many datapoints can be sent. Also, datapoints from multiple IoT devices can be sent to the encryption engine 220. The encryption engine 220 stores public keys 221, 222. Public keys 221, 222 are each received from a different requester of data. The encryption engine 220 encrypts the datapoint with public keys 221, 222 to create encrypted payloads. The encrypted payloads are sent to the datapoint access engine 230. In this example, encrypted payload 1 is encrypted with public key 1 and encrypted payload 2 is encrypted with public key 2. Thus, although each encrypted payload contains the same datapoint, each is encrypted with a different public key, the different public key corresponding to a different requester.

Now referring to FIG. 2b, requesters 251,252 obtain data from the datapoint access engine 230. The requesters send their private key to the datapoint access engine allowing the requester to receive the respective encrypted data packet. For example, the encrypted payload 1 encrypted with public key 1 is stored in the datapoint access engine 230. The encrypted data packet 1 can be retrieved from the datapoint access engine 230 using the private key 1.

Figure 3:
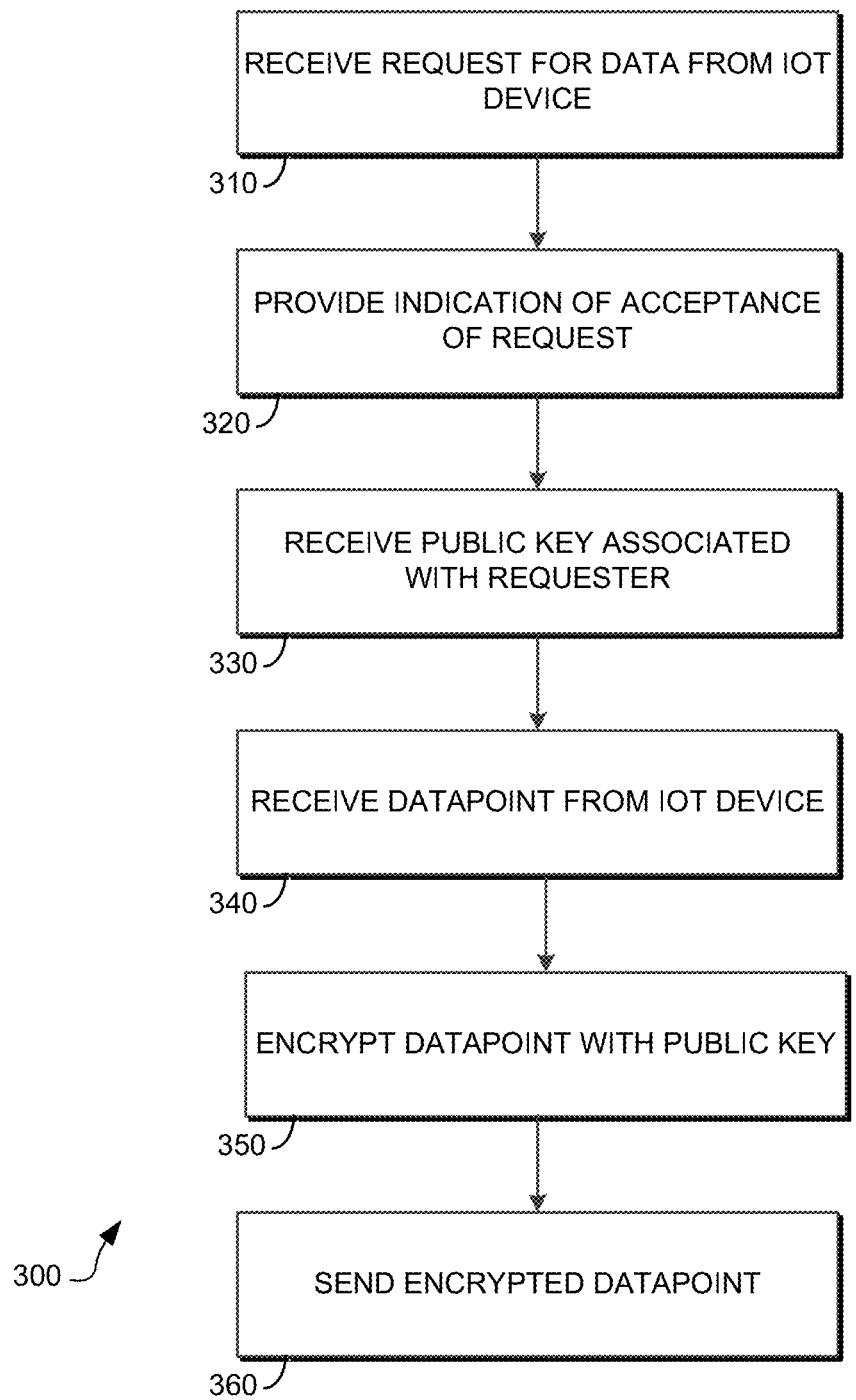
FIG. 3 is a flow diagram illustrating a method for providing specific access to datapoints of IoT devices in accordance with implementations of the present disclosure.

Turning now to FIG. 3, a method 300 for providing specific access to data of IoT devices is shown, in accordance with implementations of the present disclosure. Method 300 may be performed at the IoT hub 120 or datapoint engine 130 as described in FIG. 1, or on one or more servers in a data center or across multiple data centers.

At block 310, a request for data from one or more IoT devices is received. For example, a requester may request data from one or more IoT devices to determine interest in a product or to collect data on how a product is used. The requester may request data for a certain period of time, or for a specific interval of time. For example, the requester may request data for specific IoT devices every day at 12:00 noon. In some embodiments, requests may be received from multiple requesters. For example, a first requester may request data from a smart television, a second requester may request data from a Wi-Fi thermostat, a third request may request data from a smart refrigerator, etc.

At block 320, an indication of acceptance of the request for data from the one or more IoT devices is provided to the requester in response to the owner of the IoT devices granting access. For example, a user interface may display the various requests for data from IoT devices and the owner of the IoT devices can select one or more of the requests. In some embodiments, the selection of one or more requests is part of a transaction performed between the requester and the owner of the IoT devices. For example, a requester may offer a coupon code in exchange for data. The owner of the IoT devices can opt to provider the requester with the desired data in exchange for the coupon code.

At block 330, a public key associated with the requester is received. The public key can be part of a public/private key pair. The public key is used to encrypt the data so that the data is only viewable by the requester. Thus, the owner of the IoT devices has the ability to determine who receives data and what kind of data is received.

At block 340, a plurality of datapoints is received from the one or more IoT devices. In some embodiments, the IoT device sends data to an IoT hub or datapoint engine that collects the data. The data can be pushed to the IoT hub or pulled by the IoT hub from IoT devices. In some embodiments, the datapoints are received using a low-power communication protocol, e.g., such as an IEEE 802.15.4-based protocol. The data can be sent at a predetermined interval or upon a specific request. The data comprises datapoints, each datapoint having data for a specific point of time. Thus, if the data for an interval is requested, multiple datapoints can be collected.

At block 350, at least one of the plurality of datapoints is encrypted with the public key. The datapoints requested by the requester can be determined and only those datapoints requested can be encrypted to be sent to the requester. For example, if a health indicator for an IoT smoke alarm is collected, the datapoint can indicate whether the smoke alarm is active. This data can be encrypted and sent. In some embodiments, the encrypted datapoints are associated with an anonymous requester id. Thus, a requester can search for the encrypted datapoints by the anonymous requester id without other requesters being able to discover the identity of the requester. The data can be unique to the requester. For example, if the requester is only interested in the number of eggs in a refrigerator, only that data can be sent to the requester and only that requester may receive that data. As another example, if different requesters request the temperature of a room at different times of the data, only the temperature for the desired time can be sent to the requester.

At block 360, the encrypted at least one of the plurality of datapoints is sent. For example, the encrypted datapoint(s) can be sent to the requester. In some embodiments, the encrypted datapoint(s) is sent to a central server, where datapoints are aggregated and sent to the requester. The requester can decrypt the encrypted datapoint(s) using the private key of the public/private key pair. In some embodiments, an indication is received when the encrypted at least one of the plurality of datapoints is received by the first requester. For example, the indication can be a coupon code or an acknowledgement from the requester. In some embodiments, the datapoints are sent whenever new datapoints are received. For example, if a datapoint is received every hour, the datapoint can be encrypted and sent for each datapoint received. In some embodiments, the datapoints are aggregated and sent at some predetermined time or number of datapoints. In some embodiments, the encrypted data is sent via SSL (Secure Sockets Layer).

Figure 4:
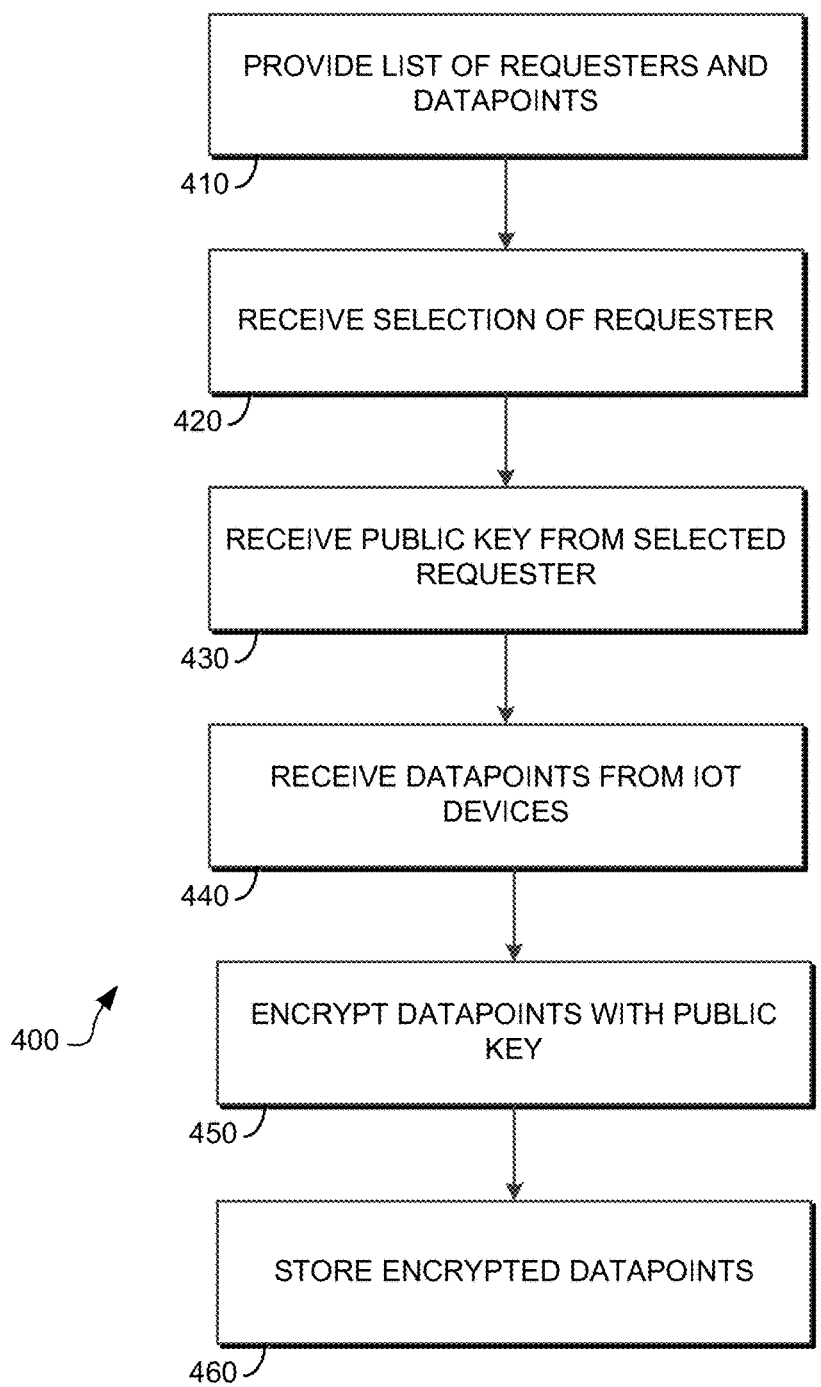
FIG. 4 is a flow diagram illustrating another method for providing specific access to datapoints of IoT devices in accordance with implementations of the present disclosure.

Turning now to FIG. 4, another method 400 for providing specific access to data of IoT devices is shown, in accordance with implementations of the present disclosure. Method 400 may be performed at the IoT hub 120 or datapoint engine 130 as described in FIG. 1, or on one or more servers in a data center or across multiple data centers.

At block 410, a list of requesters and datapoints requested by the requesters is provided to the owner of IoT devices. For instance, an owner of a requester, such as a grocery store, may want to know how much milk is in a refrigerator in the owner's home. If the refrigerator can collect that kind of data, the data can be provided to the requester for the grocery store, enabling the grocery store to determine how much milk to stock at a given time or when to reorder a shipment of milk. The grocery store may want to know the temperature inside the owner's home as well, e.g., at what temperature a thermostat inside the home is set. If the thermostat is an IoT device, the thermostat can provide the temperature, which can be used to, e.g., determine which items to stock based on the thermostat data. Although, a list of requesters is described, the owner need not receive a list of requesters, and may just select which datapoints and/or IoT devices from which to provide data. For example, the owner can decide to provide thermostat data to all requesters. Thus, any request wishing to collect thermostat data can send a public key to the owner (the details of which are described below). In some embodiments, the owner only receives requests for data that can be provide by the owner's IoT devices. For example, datapoints for at least one of one or more IoT devices must match at least one of the datapoints requested by the requester for the requester to be provided on the list. Thus, the owner is only shown requester for which the data request can be fulfilled.

At block 420, a selection of one or more of the requesters is received by the owner to grant access to IoT data. For example, the owner may determine that they would like to provide information on the contents of their refrigerator but not on the temperature of their home. The owner can select those requesters that wish to receive data from the owner's refrigerator, and not select those requesters requesting thermostat data. In some embodiments, a requester can request different types of data, e.g., refrigerator and thermostat data, and the owner can select which of data is available to the requester. Thus, data and requesters can have a one-to-one, many-to-one, or one-to-many relationship. Thus, each requester can receive different data and the owner can determine which requesters receive which data.

At block 430, a public key is received from each of the selected one or more of the requesters. If the owner elects to provide data to a requester, the requester sends a public key that is part of a public/private key pair to the owner. Each public key is associated with a selected requester, and is a unique key for the requester. This enables the owner to decide which requesters receive the data, since only those requesters with a private key of a public/private key pair used to encrypt the data can decrypt the data. For example, the owner can set rules to decide which public keys to use to encrypt data and which data to encrypt. In some embodiment, the owner need only specify the request being accepted and the process of receiving and key and encrypting data with that key occurs automatically.

At block 440, a plurality of datapoints from one or more IoT devices is received. For example, an IoT device can be constantly sending data, such as the current temperature detected by a thermostat, the currently watched channel on a television, or a status of the device. It should be understood that the list of data is exemplary and many other type of data can be envisioned. In some embodiment, the IoT device sends data upon request and/or when a status has changed. For example, an IoT thermostat can send the temperature of the house at a regular interval and/or can send the set temperatures when the temperature settings have been changed.

At block 450, the datapoints requested by each of the selected one or more of the requesters is encrypted with the public key associated with the selected one or more of the requesters. The request can specify which data to collect. For example, the requester may send a request for all datapoints from an IoT device for a specific time interval. Thus, only those datapoints (i.e., the datapoints collected during that time interval) and encrypted with the public key. It may be the case that only a single datapoint of the plurality of datapoints is requested. For example, the requester may send a request for the datapoint from the thermostat at 12:00 noon. Thus, only that datapoint is encrypted with the public key.

At block 460, the encrypted datapoints requested by each of the selected one or more requesters is stored. In some embodiments, an IoT device may not have the storage capacity to store datapoints. Thus, the IoT hub is configured to store the datapoints for the various IoT devices. In other embodiments, the datapoints are stored at a server, e.g., cloud server. The encrypted datapoints may be accessible by the selected one or more requesters using the associated private key of the public/private key pair. While a requester may receive data other than that which was requested, if the data was not encrypted with the public key of the requester, the requester cannot decrypt the data using its private key. In some embodiments, the datapoints are stored for a predetermined time period identified by the encrypted datapoints. Thus, the owner has further control of their data and the requester can be assured that the data is not stale.

These configurations enable an owner of IoT devices to provide specific access to data of IoT devices. By allowing the owner of the IoT devices to configure the access to data of IoT devices, the owner of the IoT devices has more control over their data, and can prevent private information from being accessed by unknown requesters. Furthermore, providing the ability to provide specific access to data of IoT devices, the owner of the IoT devices has more leverage with the owner of the requester and can, in some cases, receive compensation for the data. This essentially creates a market for data between owners of requesters and the owner of the IoT devices.

Figure 5:
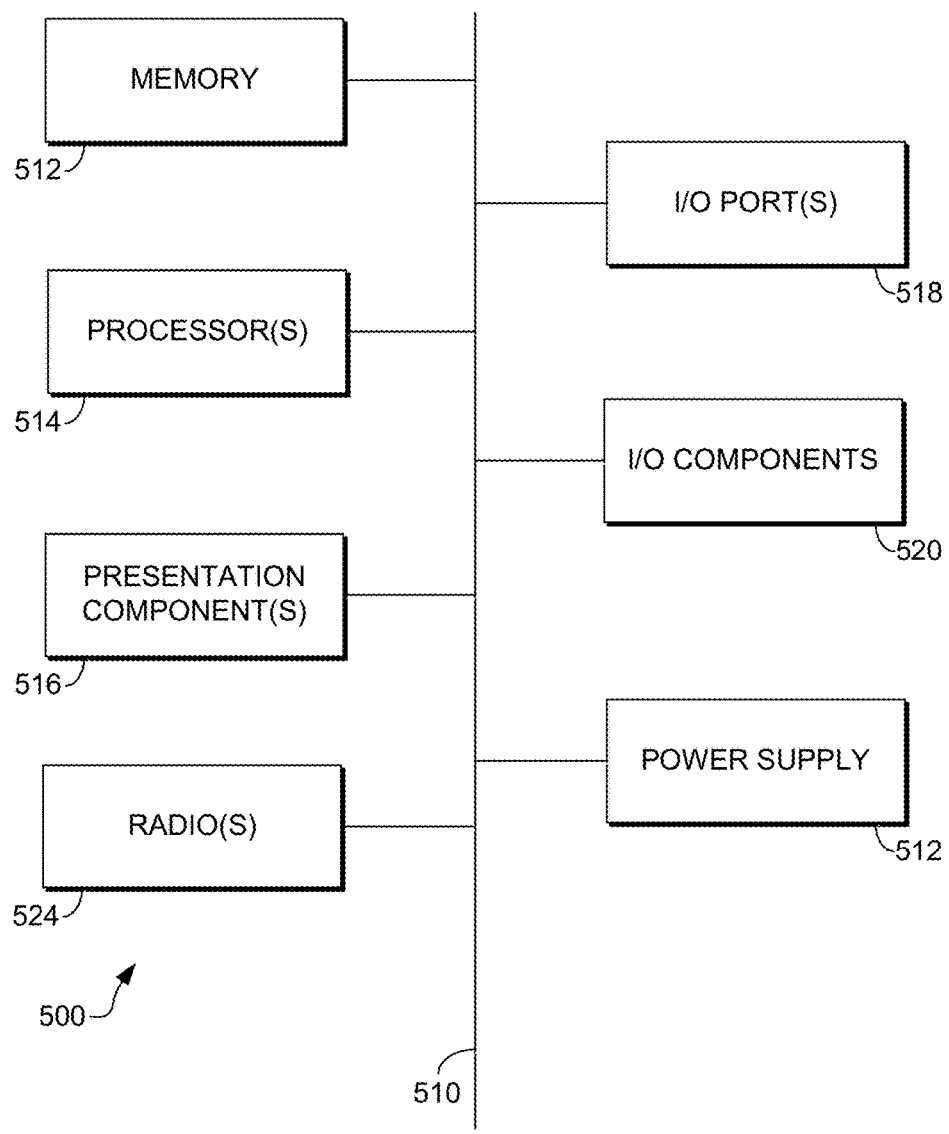
FIG. 5 is a block diagram illustrating an exemplary computing environment suitable for use in implementations of the present disclosure.

An exemplary operating environment in which embodiments of the present invention may be implemented is described below in order to provide a general context for various aspects of the present invention. Referring initially to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should the computing device 500 be interpreted as having any dependency or requirement relating to any one or combination of components illustrated.

The invention may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Aspects of the invention may be practiced in a variety of system configurations, including handheld devices, consumer electronics, general-purpose computers, specialty computing devices, etc. Aspects of the invention may also be practiced in distributed computing environments where tasks are performed by remote-processing devices that are linked through a communications network.

With reference to FIG. 5, computing device 500 includes a bus 510 that directly or indirectly couples the following devices: memory 512, one or more processors 514, one or more presentation components 516, input/output (I/O) ports 518, I/O components 520, and an illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component 520. Also, processors have memory. The inventors hereof recognize that such is the nature of the art, and reiterate that the diagram of FIG. 5 is merely illustrative of an exemplary computing device that can be used in connection with one or more aspects of the invention. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD- ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory 512 may be removable, nonremovable, or a combination thereof. Exemplary memory includes solid-state memory, hard drives, optical-disc drives, etc. Computing device 500 includes one or more processors 514 that read data from various entities such as bus 510, memory 512 or I/O components 520. Presentation component(s) 516 present data indications to a user or other device. Exemplary presentation components 516 include a display device, speaker, printing component, vibrating component, etc. I/O ports 518 allow computing device 500 to be logically coupled to other devices including I/O components 520, some of which may be built in.

Illustrative I/O components include a microphone, joystick, game pad, satellite dish, scanner, printer, display device, wireless device, a controller (such as a stylus, a keyboard and a mouse), a natural user interface (NUI), and the like. In embodiments, a pen digitizer (not shown) and accompanying input instrument (also not shown but which may include, by way of example only, a pen or a stylus) are provided in order to digitally capture freehand user input. The connection between the pen digitizer and processor(s) 514 may be direct or via a coupling utilizing a serial port, parallel port, and/or other interface and/or system bus known in the art. Furthermore, the digitizer input component may be a component separated from an output component such as a display device or, in some embodiments, the usable input area of a digitizer may be co-extensive with the display area of a display device, integrated with the display device, or may exist as a separate device overlaying or otherwise appended to a display device. Any and all such variations, and any combination thereof, are contemplated to be within the scope of embodiments of the present invention.

A NUI processes air gestures, voice, or other physiological inputs generated by a user. Appropriate NUI inputs may be interpreted as ink strokes for presentation in association with the computing device 500. These requests may be transmitted to the appropriate network element for further processing. A NUI implements any combination of speech recognition, touch and stylus recognition, facial recognition, biometric recognition, gesture recognition both on screen and adjacent to the screen, air gestures, head and eye tracking, and touch recognition associated with displays on the computing device 500. The computing device 500 may be equipped with depth cameras, such as, stereoscopic camera systems, infrared camera systems, RGB camera systems, and combinations of these for gesture detection and recognition. Additionally, the computing device 500 may be equipped with accelerometers or gyroscopes that enable detection of motion. The output of the accelerometers or gyroscopes may be provided to the display of the computing device 500 to render immersive augmented reality or virtual reality.

A computing device may include a radio. The radio transmits and receives radio communications. The computing device may be a wireless terminal adapted to received communications and media over various wireless networks. Computing device 500 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a Wi-Fi® connection to a device (e.g., mobile hotspot) that provides access to a wireless communications network, such as a WLAN connection using the 802.11 protocol. A Bluetooth connection to another computing device is second example of a short-range connection. A long-range connection may include a connection using one or more of CDMA, GPRS, GSM, TDMA, and 802.16 protocols.

Accordingly, embodiments of the invention may be described in the general context of computer-executable instructions, such as program modules, being executed by a computer. Generally, program modules include routines, programs, objects, components, data structures, etc., that perform particular tasks or implement particular abstract data types. The embodiments may also be practiced in distributed computing environments or cloud environments where tasks are performed by remote-processing devices that are linked through a communications network. In a distributed computing environment, program modules may be located in both local and remote computer storage media including memory storage devices.

Embodiments of the present invention have been described in relation to particular embodiments, which are intended in all respects to be illustrative rather than restrictive. Alternative embodiments will become apparent to those of ordinary skill in the art to which the present invention pertains without departing from its scope.

Aspects of the invention have been described to be illustrative rather than restrictive. It will be understood that certain features and subcombinations are of utility and may be employed without reference to other features and subcombinations. This is contemplated by and is within the scope of the claims.

What is claimed is:

1. A method for providing specific access to data from Internet of Things (IoT) devices comprising:
    receiving a first request from a first requester for data from one or more IoT devices;
    providing the first request to an owner of the one or more IoT devices;
    receiving an indication of acceptance of the first request by the owner of the one or more IoT devices;
    receiving a first public key associated with the first requester, the first public key being part of a public/private key pair;

receiving a second request from a second requester for data from the one or more IoT devices;
providing the second request to the owner of the one or more IoT devices;
receiving an indication of acceptance of the second request by the owner of the one or more IoT devices;
receiving a second public key associated with the second requester, the second public key being part of a second public/private key pair;
receiving a plurality of datapoints from the one or more IoT devices;
encrypting at least one of the plurality of datapoints with the first public key;
encrypting another one of the plurality of datapoints with the second public key;
sending the encrypted at least one of the plurality of datapoints, the encrypted at least one of the plurality of datapoints allowing decryption using a first private key of the public/private key pair; and
sending the encrypted another one of the plurality of datapoints, the encrypted another one of the plurality of datapoints allowing decryption using a second private key of the second public/private key pair, the encrypted another one of the plurality of datapoints preventing decryption using the first private key, the encrypted at least one of the plurality of datapoints preventing decryption using the second private key, the encrypted another one of the plurality of datapoints being associated with an anonymous requester ID.

2. The method of claim 1, further comprising:
receiving an indication when the encrypted at least one of the plurality of datapoints is received by the first requester.

3. The method of claim 1, wherein the receiving a plurality of datapoints, encrypting at least one of the plurality of datapoints, and sending the encrypted at least one of the plurality of datapoints are performed at a regular interval.

4. The method of claim 1, wherein the encrypted at least one of the plurality of datapoints is sent using Secure Sockets Layer (SSL).

5. The method of claim 1, wherein the plurality of datapoints are received from the one or more IoT devices using a low-power communication protocol.

6. The method of claim 1, further comprising:
receiving a list of a plurality of requesters and datapoints requested by the plurality of requesters;
receiving a selection of one or more requesters by the owner of the one or more IoT devices from the list of the plurality of requesters;
receiving a unique public key associated with each of the selected one or more requesters;
encrypting the datapoints requested by each of the selected one or more requesters with the unique public key associated with the selected one or more requesters; and
sending the encrypted datapoints requested by each of the selected one or more requesters.

7. The method of claim 6, wherein each of the selected one or more requesters receives different datapoints.

8. One or more computer-readable storage media storing instruction that, when executed, cause a computing device to provide specific access to data from Internet of Things (IoT) devices, the instruction comprising:
providing, to an owner of one or more IoT devices, a list of requesters and datapoints of the one or more IoT devices requested by the requesters;
receiving, from the owner of the one or more IoT devices, a selection granting approval to two or more of the requesters;
receiving a public key from each of the selected two or more of the requesters, the public key being associated with the selected two or more of the requesters, the public key being a unique key;
receiving a plurality of datapoints from the one or more IoT devices;
encrypting the datapoints requested by each of the selected two or more of the requesters with the public key associated with the selected two or more of the requesters; and
storing the encrypted datapoints requested by each of the selected two or more requesters, the encrypted datapoints being accessible by the selected two or more requesters using an associated private key, at least one of the encrypted datapoints being associated with an anonymous requester ID.

9. The one or more computer-readable storage media of claim 8, wherein the instructions further comprise:
determining that datapoints for at least one of one or more IoT devices matches at least one of the datapoints requested by the requesters.

10. The one or more computer-readable storage media of claim 8, wherein encrypted datapoints are stored for a predetermined time period identified by the encrypted datapoints.

11. The one or more computer-readable storage media of claim 8, wherein two or more requesters request same datapoints, and wherein the same datapoints are encrypted separately using the public keys for each of the two or more requesters.

12. The one or more computer-readable storage media of claim 8, wherein the plurality of encrypted datapoints is accessed using Secure Sockets Layer (SSL).

13. A system comprising:
a processor;
memory; and
a datapoint access engine configured to:
receive, from a requester, a request to access data from one or more Internet of Things (IoT) devices;
provide, to an owner of the one or more IoT devices, the request to access data from the one or more IoT devices;
receive, from the owner of the one or more IoT devices, an access grant for the request to access data from the one or more IoT devices;
receive a request for a plurality of encrypted datapoints for the one or more IoT devices from the requester, the request being signed by a first public key;
receive the plurality of encrypted datapoints, the plurality of encrypted datapoints being encrypted by the first public key;
send the plurality of encrypted datapoints to the requester;
receive a second request for the plurality of encrypted datapoints from a second requester, the second request being signed by a second public key; and
send a second plurality of encrypted datapoints to the second requester, the second plurality of encrypted datapoints being decrypted by the second public key and not the first public key, the second plurality of encrypted datapoints being associated with an anonymous requester ID.

14. The system of claim 13, wherein the sending the plurality of encrypted datapoints to the requester comprises:

providing a repository of the encrypted datapoints, wherein the repository is visible to a plurality of other requesters, wherein each encrypted datapoint comprises an encrypted identifier identifying the requester of the corresponding encrypted datapoint; and sending the encrypted datapoints with the encrypted identifier corresponding to the requester.

15. The system of claim 13, wherein the encrypted datapoint comprises a datapoint name, an encrypted value, a time interval, and a requester ID.

16. The system of claim 15, wherein the datapoint access engine stores the encrypted datapoint for the time interval specified in the encrypted datapoint.

17. The system of claim 13, wherein the datapoint access engine receives encrypted datapoints from a plurality of owners, and wherein the plurality of encrypted datapoints sent to the requester comprises the encrypted datapoints from the plurality of owners.

* * * * *